United States Patent
Kataoka et al.

(10) Patent No.: US 10,981,516 B2
(45) Date of Patent: Apr. 20, 2021

(54) VEHICLE SPEAKER DISPOSITION STRUCTURE

(71) Applicant: MAZDA MOTOR CORPORATION, Hiroshima (JP)

(72) Inventors: Yuki Kataoka, Hiroshima (JP); Hidenori Matsuoka, Hiroshima (JP); Takeshi Nakamura, Hiroshima (JP); Kiyoshi Mutsura, Higashihiroshima (JP); Akihiro Fujiwara, Higashihiroshima (JP); Yoshihiro Teshima, Higashihiroshima (JP); Koji Wakamatsu, Hiroshima (JP); Hiroshi Yamanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/495,765

(22) PCT Filed: Feb. 23, 2018

(86) PCT No.: PCT/JP2018/006805
§ 371 (c)(1),
(2) Date: Sep. 19, 2019

(87) PCT Pub. No.: WO2018/180089
PCT Pub. Date: Oct. 4, 2018

(65) Prior Publication Data
US 2020/0108781 A1 Apr. 9, 2020

(30) Foreign Application Priority Data
Mar. 30, 2017 (JP) .............................. JP2017-066892

(51) Int. Cl.
*B60R 11/02* (2006.01)
*H04R 1/02* (2006.01)

(52) U.S. Cl.
CPC .......... *B60R 11/0217* (2013.01); *H04R 1/021* (2013.01); *H04R 1/025* (2013.01); *H04R 2499/13* (2013.01)

(58) Field of Classification Search
CPC ..... B60R 11/0217; H04R 1/021; H04R 1/025; H04R 2499/13
(Continued)

(56) References Cited

U.S. PATENT DOCUMENTS 6,614,913 B1    9/2003  Allen
9,738,322 B2 *  8/2017  Matthiessen ........... B62D 25/04
(Continued)

FOREIGN PATENT DOCUMENTS

DE    102005047244 B3    5/2007
DE    10 2009 036 714 A1  2/2011
(Continued)

OTHER PUBLICATIONS

International Search Report issued in PCT/JP2018/006805; dated Apr. 3, 2018.

*Primary Examiner* — Davetta W Goins
*Assistant Examiner* — Daniel R Sellers
(74) *Attorney, Agent, or Firm* — Studebaker & Brackett PC (57) ABSTRACT

To a hinge pillar including a hinge pillar inner and a hinge pillar outer that form a closed cross-section extending vertically, a speaker box configured to hold and house a speaker therein is joined and fixed. As necessary, the speaker box includes a box part formed of a sheet metal member including a bottom and side walls that form a housing space housing the speaker, together with the bottom. The box part is arranged in the opening, with the bottom located in the closed cross-section and with the housing space open inside a vehicle cabin, and is joined to an edge of the opening.

12 Claims, 8 Drawing Sheets

(58) Field of Classification Search
USPC .......................................................... 381/86
See application file for complete search history.

(56) References Cited

U.S. PATENT DOCUMENTS

| | | |
|---|---|---|
| 2007/0154055 A1 | 7/2007 | Nichols et al. |
| 2008/0247564 A1* | 10/2008 | Albus ................ B60R 11/0217 |
| | | 381/86 |
| 2008/0263110 A1 | 10/2008 | Kelly et al. |
| 2010/0226521 A1* | 9/2010 | Smith, III .............. H04R 1/025 |
| | | 381/332 |
| 2014/0050350 A1 | 2/2014 | Weber et al. |
| 2016/0068199 A1 | 3/2016 | Matthiessen et al. |
| 2016/0368430 A1 | 12/2016 | Orellana et al. |
| 2017/0013336 A1* | 1/2017 | Stys ..................... H04R 1/2811 |
| 2018/0244212 A1* | 8/2018 | Negishi ................. H04R 1/026 |

FOREIGN PATENT DOCUMENTS

| | | |
|---|---|---|
| DE | 10 2016 111 368 A1 | 12/2016 |
| EP | 1 106 439 A2 | 6/2001 |
| EP | 1 276 346 A1 | 1/2003 |
| FR | 2 665 996 A1 | 2/1992 |
| JP | S56-089730 U | 7/1981 |
| JP | S56-155575 U | 11/1981 |
| JP | S57-024179 U | 2/1982 |
| JP | 2001-218289 A | 8/2001 |
| JP | 2001-339784 A | 12/2001 |
| JP | 2007-022281 A | 2/2007 |
| JP | 2009-510586 A | 3/2009 |
| JP | 2015-530952 A | 10/2015 |

* cited by examiner

VEHICLE SPEAKER DISPOSITION STRUCTURE

TECHNICAL FIELD

The present invention relates to a structure for disposing a speaker in a vehicle.

BACKGROUND

Patent Document 1 suggests a structure of a vehicle body whose fender is provided therein with an acoustic transducer as a speaker.

In Patent Document 1, the acoustic transducer is disposed in the fender located near a front corner of a vehicle cabin, and sound is reproduced from the vicinity of the front corner toward the vehicle cabin. By employing such a structure, an improvement in the reproduction efficiency, of high-quality sound including a low range, with a wide range of directivity in a plan view, is expected.

CITATION LIST

Patent Document

PATENT DOCUMENT 1: Japanese Unexamined Patent Publication (Japanese Translation of PCT Application) No. 2015-530952

SUMMARY OF THE INVENTION

Technical Problem

In Patent Document 1, however, the speaker is disposed in the fender, which is a non-rigid body member. There is a fear in such a structure that the vibration of the sound reproduced by the speaker may cause noise from the vehicle body, even if the speaker is jointed to the frame of the fender.

The technique disclosed herein is made in view of the problem. It is an objective of the present disclosure to provide a structure for disposing a speaker in a vehicle, while achieving both an improvement in the reproduction efficiency of the speaker and a reduction in the noise generated in a vehicle body due to sound reproduced from the speaker.

Solution to the Problem

The present disclosure is directed to a structure for arranging a speaker in a vehicle. The structure includes: a hinge pillar including a hinge pillar inner and a hinge pillar outer that form a closed cross-section extending vertically; and a speaker box fixed to the hinge pillar and configured to hold and house a speaker therein.

According to this configuration, the hinge pillar is located at the front corner of a vehicle cabin. Thus, the joining of the speaker box to the hinge pillar allows for arrangement of the speaker at the front corner of the vehicle cabin, and efficient transmission of the sound generated by the speaker from the corner toward the vehicle cabin. In addition, since the speaker box that holds and houses the speaker inside is fixed to the rigid hinge pillar, the abnormal noise according to the sound generated by the speaker effectively decreases.

Therefore, an improvement in the reproduction efficiency of the speaker and a reduction in the abnormal noise of the vehicle generated by the speaker are both achievable.

As one aspect of the present disclosure, an opening may be open in a transverse direction of the vehicle in the hinge pillar inner. The speaker box may include a box part formed of a sheet metal member including a bottom and side walls that form a housing space housing the speaker, together with the bottom. The box part may be arranged in the opening, with the bottom located in the closed cross-section and with the housing space open inside a vehicle cabin, and may be joined to an edge of the opening.

According to this configuration, the box part is joined to the edge of the opening of the hinge pillar inner, and is the sheet metal member. The hinge pillar is provided with the opening, whose edge is jointed to the speaker box. This also allows the hinge pillar to exhibit a sufficient strength. The advantages described above, that is, an improvement in the reproduction efficiency of the speaker and a reduction in the abnormal noise of the vehicle generated by the speaker are both more achievable.

The term "sheet metal member" is here not intended to limit the processing method, and represents a general metal member to be joined to the vehicle body.

As one aspect of the present disclosure, a lower part of the hinge pillar inner may include a rear edge extending rearward toward a bottom. The box part may be arranged at the lower part of the hinge pillar inner. A lower rear of the box part may be bulged more rearward than an upper rear of the box part along a lower rear edge of the hinge pillar inner. The lower rear may include an inclined surface between a vehicle outer side surface being the bottom of the box part and a lower surface being a part of the side walls of the box part.

According to this configuration, in the electrodeposition process, the electrodeposition liquid, which has flowed into the space inside the box part, is efficiently discharged, without retaining the electrodeposition liquid particularly at the lower rear (particularly, the inclined surface of the lower rear). Reliable rust-proofing treatment is thus possible. This allows for joining of the speaker box to the hinge pillar in the assembly process of the vehicle body. In addition, assume that an inner box part is arranged more inward than the box part in the vehicle after the electrodeposition process. This arrangement seals the inside of the speaker box to more efficiently transmit the sound generated by the speaker toward the vehicle cabin.

As one aspect of the present disclosure, an angle between the lower surface and the vehicle outer side surface at the lower rear of the box part may be set to be obtuse.

According to this configuration, in the electrodeposition process, the electrodeposition liquid, which has flowed into the space inside the box part, is efficiently discharged, without retaining the electrodeposition liquid particularly at the lower rear. This allows for joining of the speaker box to the hinge pillar in the assembly process of the vehicle body.

As one aspect of the present disclosure, the hinge pillar may include a hinge pillar reinforcement. The hinge pillar reinforcement may be coupled to the box part and to a side sill which is fixed to a lower part of the hinge pillar and extends in the longitudinal direction of the vehicle.

According to this configuration, the hinge pillar reinforcement is coupled to the hinge pillar inner not directly but via the box part, which is the sheet metal member, to allow the box part to function as a part of the hinge pillar reinforcement. This configuration reduces the size (i.e. simplifies the shape) of the hinge pillar reinforcement itself and reduces the weight of the hinge pillar reinforcement, while providing a sufficient strength at the joint between the hinge pillar and the side sill.

Advantages of the Invention

The technique disclosed herein achieves both an improvement in the reproduction efficiency of the speaker and a reduction in the noise caused in the vehicle body by the sound generated by the speaker.

DESCRIPTION OF EMBODIMENT

Now, an embodiment of a speaker disposition structure according to the present disclosure will be described in detail with reference to the drawings. Note that the speaker disposition structure described below is a mere example.

Figure 1A:
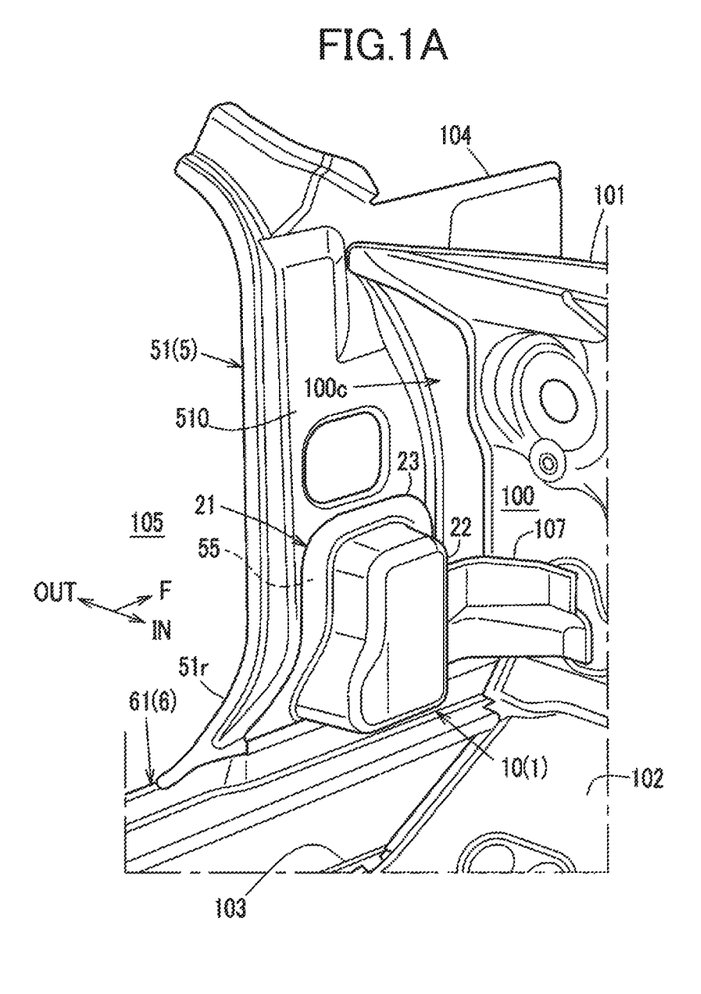
FIG. 1A is a perspective view of a speaker disposition structure according to an embodiment of the present disclosure and the periphery, as viewed from a vehicle cabin.
Figure 1B:
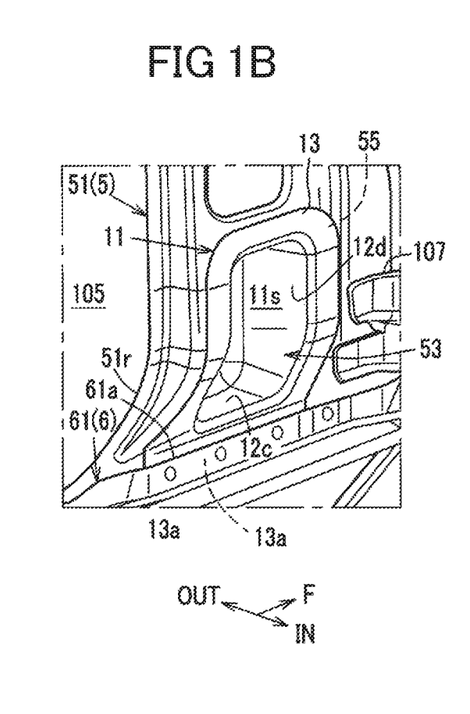
FIG. 1B is a perspective view of a speaker disposition structure according to an embodiment of the present disclosure and the periphery, as viewed from a vehicle cabin.
Figure 2:
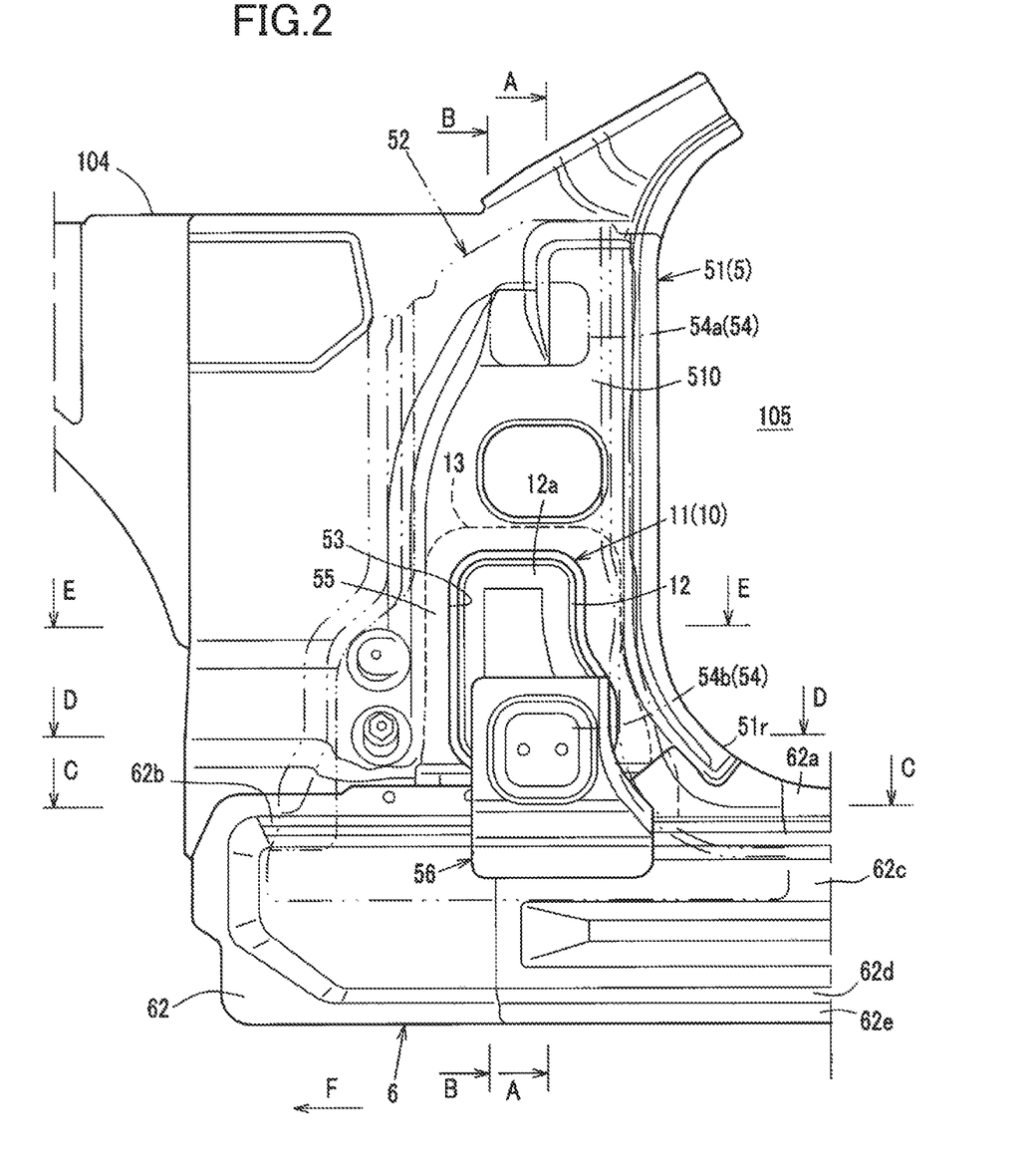
FIG. 2 illustrates the speaker disposition structure according to the embodiment and the periphery, as viewed from the outside in the transverse direction of the vehicle.
Figure 3:
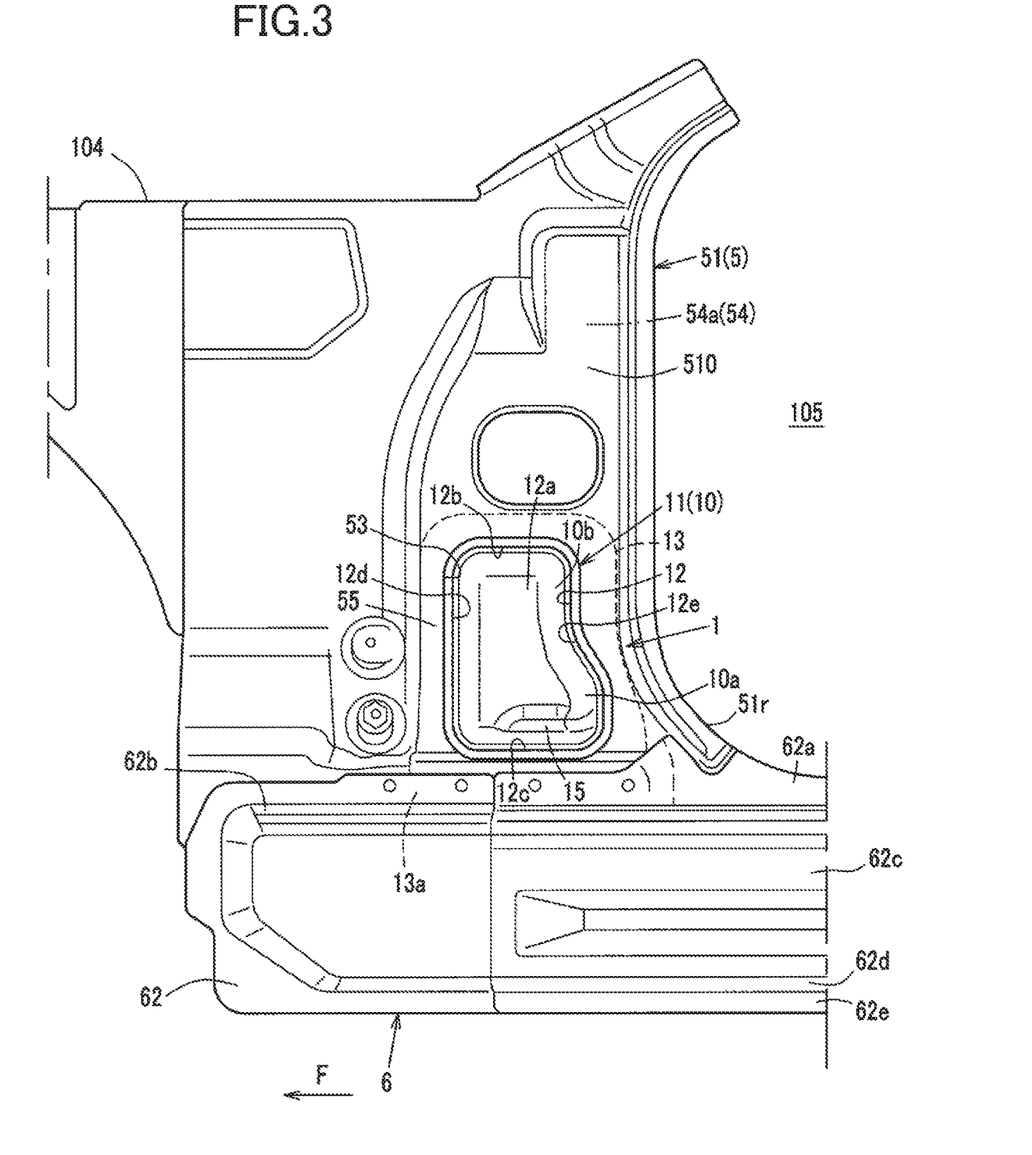
FIG. 3 corresponds to FIG. 2 illustrating a state with a hinge pillar reinforcement detached.
Figure 4:
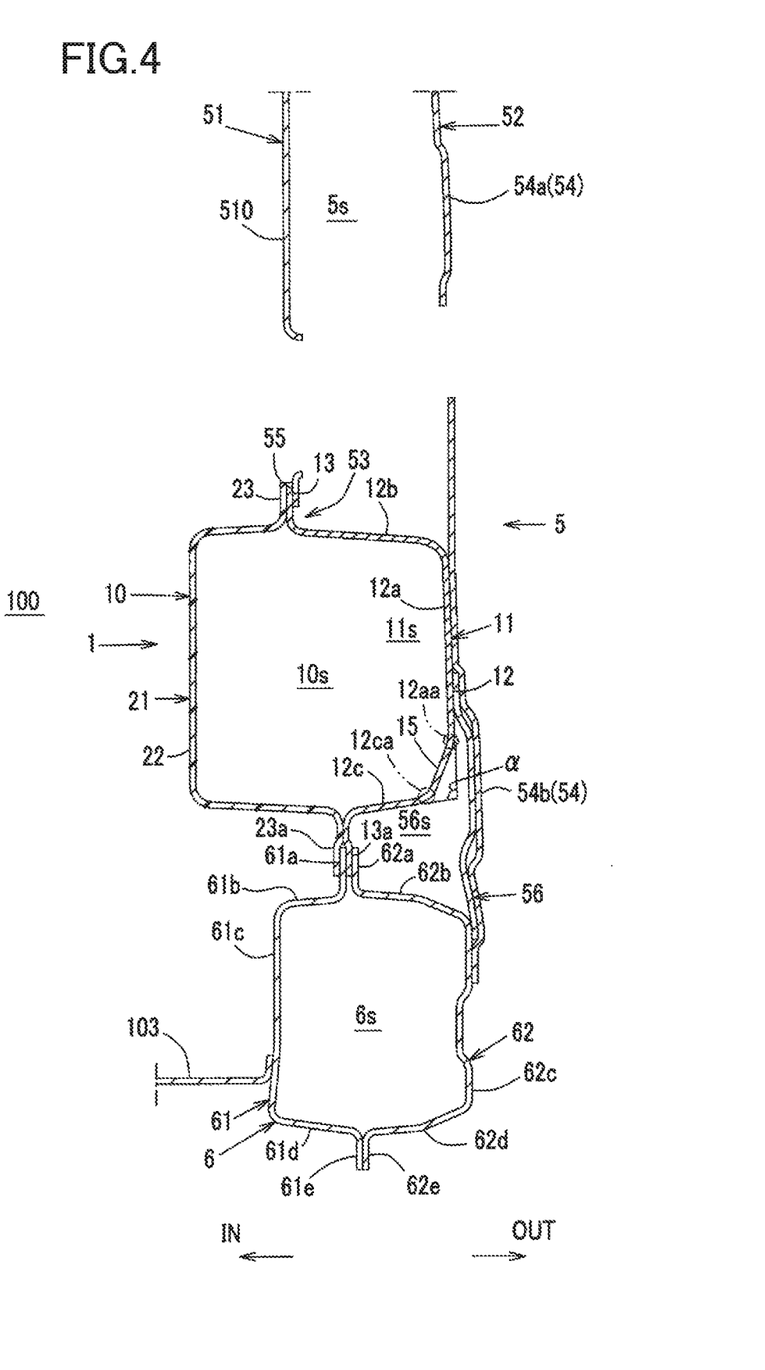
FIG. 4 is an enlarged cross-sectional view taken along line A-A in FIG. 2.
Figure 5:
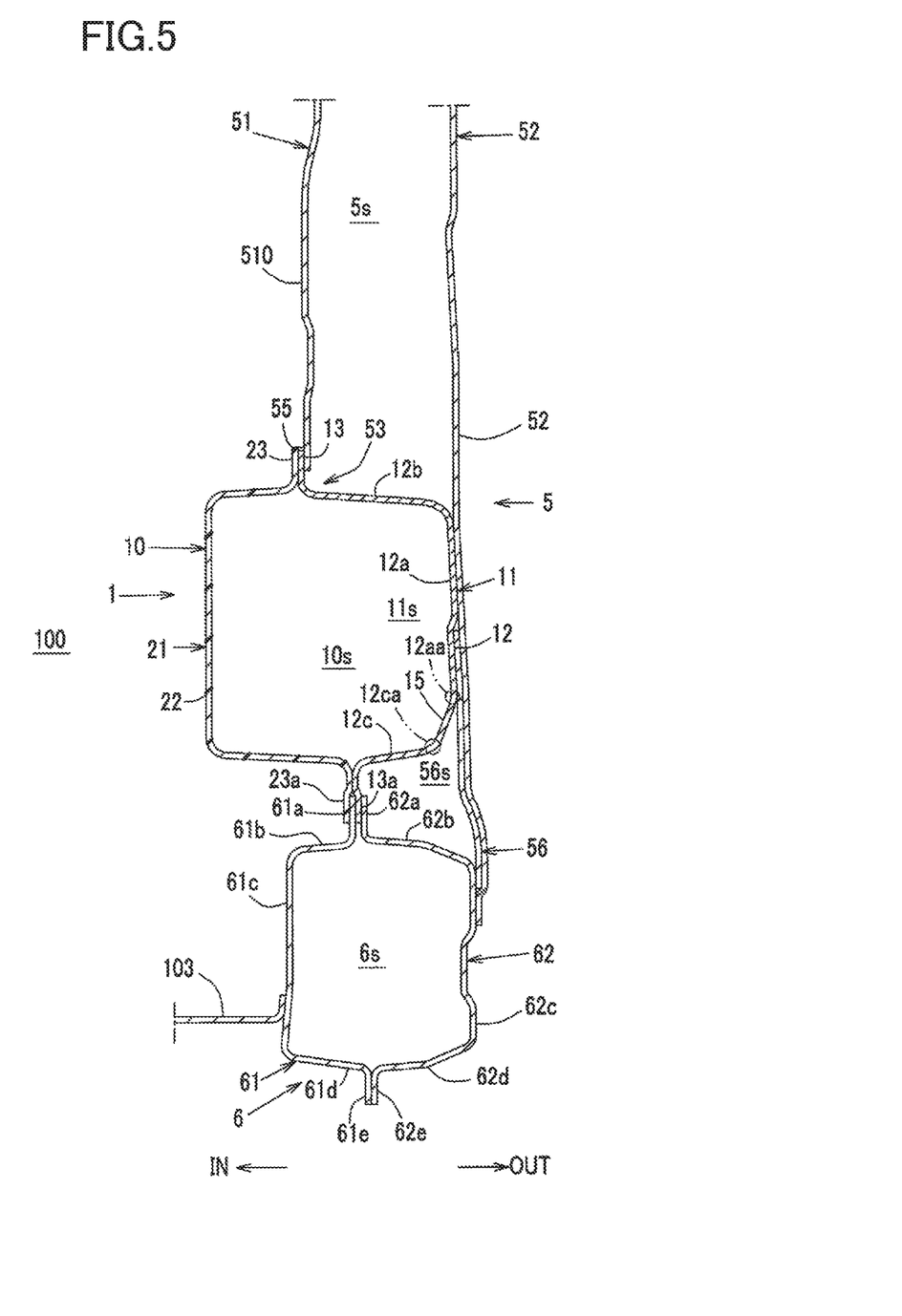
FIG. 5 is an enlarged cross-sectional view taken along line B-B in FIG. 2.
Figure 6:
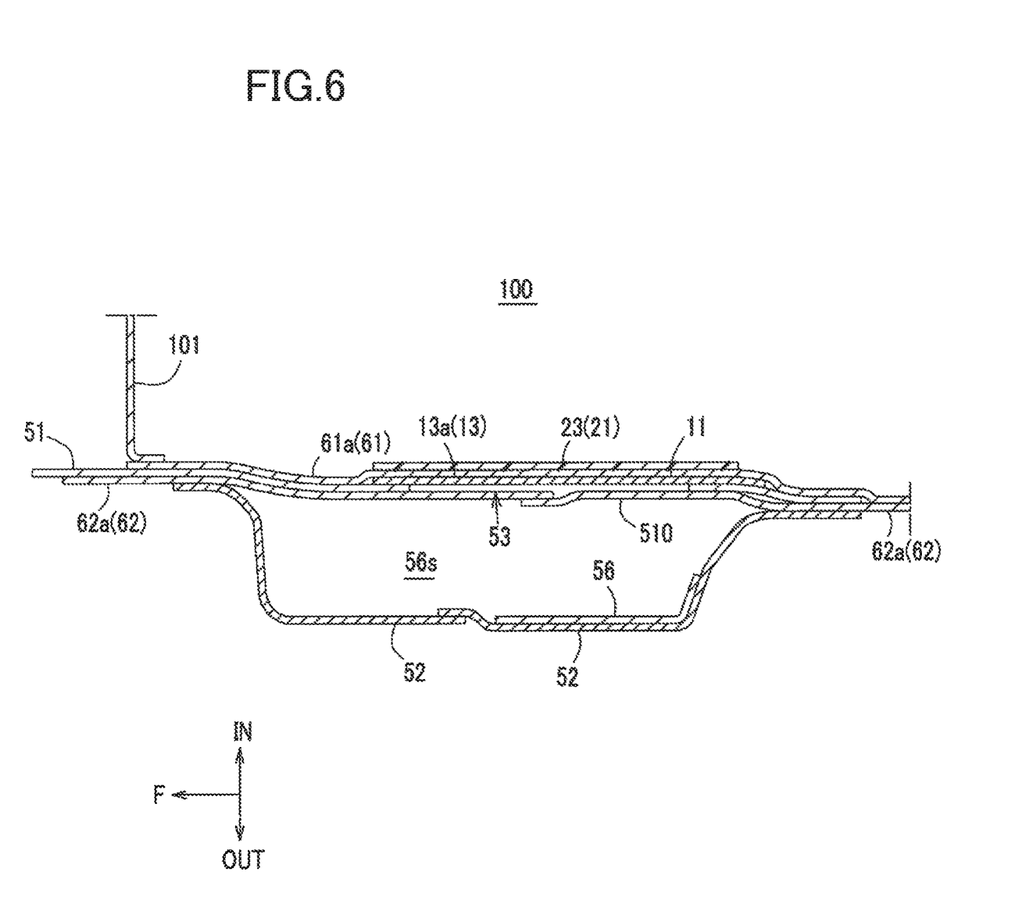
FIG. 6 is an enlarged cross-sectional view taken along line C-C in FIG. 2.
Figure 7:
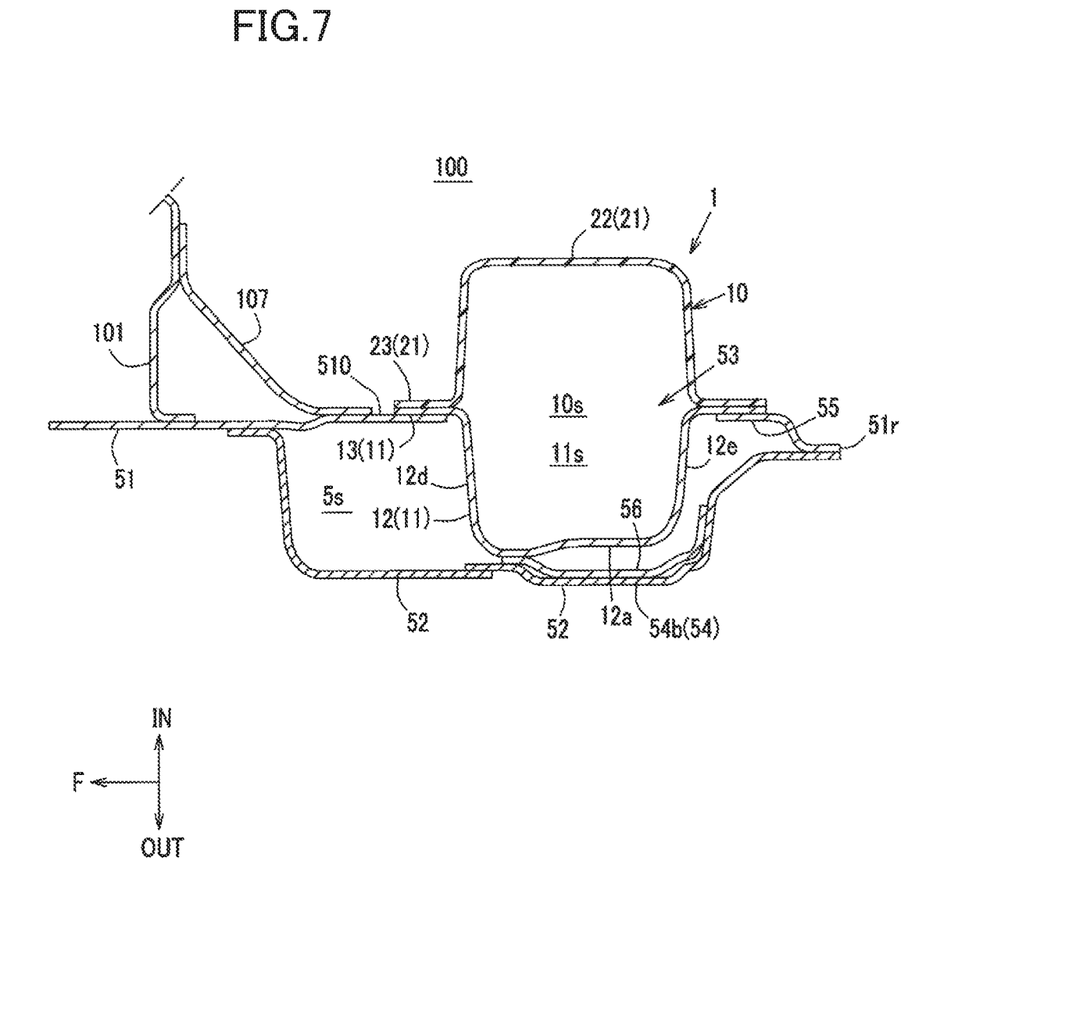
FIG. 7 is an enlarged cross-sectional view taken along line D-D in FIG. 2.
Figure 8:
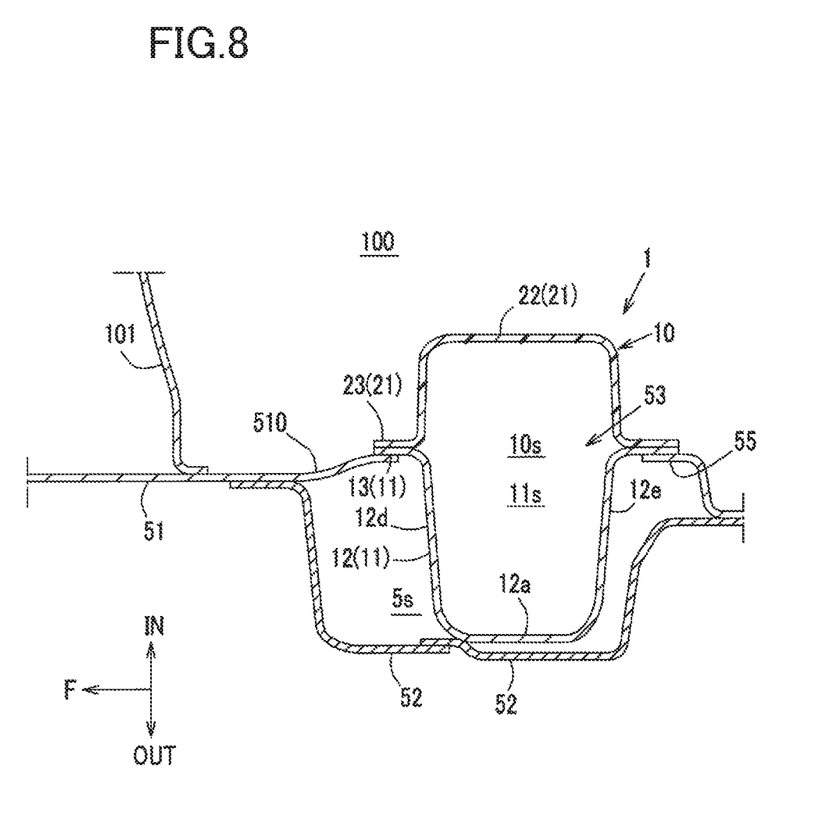
FIG. 8 is an enlarged cross-sectional view taken along line E-E in FIG. 2.

FIG. 1A is a perspective view of a speaker disposition structure according to an embodiment of the present disclosure and the periphery of the structure, as viewed from a vehicle cabin. FIG. 1B illustrates a main part in detail, with an inner box part detached from the structure in FIG. 1A. FIG. 2 illustrates the speaker disposition structure according to the embodiment and the periphery of the structure, as viewed from the outside in the transverse direction of the vehicle. FIG. 3 corresponds to FIG. 2 illustrating a state with a hinge pillar reinforcement detached. FIG. 4 is an enlarged cross-sectional view taken along line A-A in FIG. 2. FIG. 5 is an enlarged cross-sectional view taken along line B-B in FIG. 2. FIG. 6 is an enlarged cross-sectional view taken along line C-C in FIG. 2. FIG. 7 is an enlarged cross-sectional view taken along line D-D in FIG. 2. FIG. 8 is an enlarged cross-sectional view taken along line E-E in FIG. 2.

FIGS. 2 and 3 illustrate a state with a hinge pillar outer detached.

In the drawings, arrow F indicates the front of the vehicle, arrow IN indicates the inner side in the transverse direction of the vehicle (i.e., the vehicle interior), and arrow OUT indicates the outer side in the transverse direction of the vehicle. Speaker disposition structures according to the present embodiment are provided on both the right and left of the vehicle to be symmetric bilaterally. Unless particularly mentioned, the embodiment will be described based on the speaker disposition structure on the left of the vehicle and the peripheral structure.

As shown in FIG. 1B, a hinge pillar 5 for mounting a front door (not shown) is disposed at a front corner 100c of a vehicle cabin 100. Coupled to the lower end of the hinge pillar 5 is the front end of a side sill 6 extending in the longitudinal direction of the vehicle. On each side of the vehicle, the hinge pillar 5 constitutes the lower front edge of a door opening 105 and the side sill 6 constitutes the lower edge of the door opening 105. The hinge pillar 5 constitutes the front corner 100c of the vehicle cabin 100, together with a dash panel 101 extending in the transverse direction of the vehicle.

In FIG. 1A, a reference numeral 102 denotes a toe board, and a reference numeral 103 denotes a floor panel. In FIGS. 1A and 3, a reference numeral 104 denotes a wheel apron reinforcement. In FIGS. 1A, 1B, and 7, a reference numeral 107 denotes a dash gusset as a brace member.

As shown in FIGS. 2 and 4 to 8, the hinge pillar 5 mainly includes a hinge pillar inner 51, a hinge pillar outer 52, and a hinge pillar reinforcement 56 as a reinforcement member (see particularly, FIGS. 2, 4 and 7). The hinge pillar inner 51 extends vertically at the inner side in the transverse direction of the vehicle. The hinge pillar outer 52 extends vertically at the outer side in the transverse direction of the vehicle, and has a substantially hat-like cross-section raised outward in the transverse direction of the vehicle. The hinge pillar reinforcement 56 (in particular, see FIGS. 2, 4, and 7) is interposed between the hinge pillar inner 51 and the hinge pillar outer 52 in the transverse direction of the vehicle. The front and rear ends of the hinge pillar inner 51 and the hinge pillar outer 52 are joined together to form a closed cross-section 5s (see FIGS. 4 and 7) extending vertically.

All the hinge pillar inner 51, hinge pillar outer 52, and hinge pillar reinforcement 56 of the hinge pillar 5 are sheet metal members as rigid body members. As described above, the hinge pillar 5 includes, inside, the closed cross-section 5s extending vertically. Accordingly, the hinge pillar 5 has a relatively high rigidity to receive an impact load such as a side impact load transmitted through the front door and transmit the impact load to the side sill 6. In addition, the hinge pillar 5 supports the front door (not shown) arranged corresponding to the door opening 105, while allowing the front door to open and close.

More specifically, the front end of the front door (not shown) is pivotally attached to the upper and lower parts of the hinge pillar 5 via hinges (not shown). The upper and lower sides of the hinge pillar outer 52 are provided with hinge pivots 54 (54a and 54b) raised, like pedestals, outward in the transverse direction of the vehicle, in relation to the periphery of the upper and lower sides.

As shown in FIGS. 1A to 4, the hinge pillar inner 51 has an inner wall 510 of the hinge pillar, which forms the closed cross-section 5s from the vehicle cabin 100. As shown in FIGS. 1A, 1B, and 3, a rear edge 51r is formed as the lower part of the inner wall 510 of the hinge pillar, that is, the joint (i.e., the edge) between the inner wall 510 and the side sill 6 to be gradually bulged rearward toward the bottom so that the lower part of the inner wall 510 is longitudinally longer than the upper part of the inner wall 510. An opening 53 is formed in the lower part of such an inner wall 510 of the hinge pillar.

As shown in FIG. 4, the opening 53 penetrates the inner wall 510 of the hinge pillar in the transverse direction (i.e., along the thickness) of the vehicle. In the opening 53, the closed cross-section 5s of the hinge pillar 5 is open toward the vehicle cabin 100.

As will be described later, the lower end of the opening 53 is defined by (upper end flanges 61a and 62a, which will be described later, of) the side sill 6.

Specifically, the inner wall 510 of the hinge pillar is cut out in the region extending upward from the lower end to correspond to the opening 53. The inner wall 510 is formed like an opening with no lower end in the region corresponding to the opening 53 (see FIG. 4).

As shown in FIGS. 1B and 3, in a front view (as viewed from a side of the vehicle), such an opening 53 has a substantially rectangular shape, whose vertical length is longer than the longitudinal length. However, the lower rear of the opening 53 is bulged more rearward than the upper rear to correspond to the shape of the rear edge 51r of the hinge pillar inner 51.

As shown in FIGS. 1A, 4, and 5, the side sill 6 is arranged outside the floor panel 103 in the transverse direction of the vehicle, and mainly includes a side sill inner 61 and a side sill outer 62. The side sill inner 61 has a substantially hat-like cross-section extending longitudinally at the inner side in the transverse direction of the vehicle. The side sill outer 62 has a substantially hat-like cross-section extending longitudinally at the outer side in the transverse direction of the vehicle.

Specifically, as shown in FIGS. 1A, 4, and 5, the side sill inner 61 includes an upper end flange 61a, an upper surface (shoulder) 61b, an inner surface 61c in the transverse direction of the vehicle, a lower surface 61d, and a lower end flange 61e, in this order from top to bottom. The upper surface 61b extends substantially horizontally inward in the transverse direction of the vehicle, from the lower end of the upper end flange 61a. The inner surface 61c extends downward from the inner end of the upper surface 61b. The lower surface 61d extends substantially horizontally outward in the transverse direction of the vehicle, from the lower end of the inner surface 61c. The lower end flange 61e extends downward from the outer end of the lower surface 61d. On the other hand, as shown in FIGS. 4 and 5, the side sill outer 62 includes an upper end flange 62a, an upper surface (shoulder) 62b, an outer surface 62c in the transverse direction of the vehicle, a lower surface 62d, and a lower end flange 62e, in this order from top to bottom. The upper surface 62b extends substantially horizontally outward in the transverse direction of the vehicle, from the lower end of the upper end flange 62a. The outer surface 62c extends downward from the outer end of the upper surface 62b. The lower surface 62d extends substantially horizontally inward in the transverse direction, from the lower end of the outer surface 62c. The lower end flange 62e extends downward from the inner end of the lower surface 62d.

As shown in FIGS. 4 to 6, the upper end flange 61a of the side sill inner 61 and the upper end flange 62a of the side sill outer 62 are joined to a lower end flange 13a of an outer box part 11, which will be described later, to sandwich the lower end flange 13a from both the sides in the transverse direction of the vehicle. At the same time, the lower end flange 61e of the side sill inner 61 and the lower end flange 62e of the side sill outer 62 are joined together to form a closed cross-section 6s extending along the longitudinal direction of the vehicle.

As shown in FIGS. 1A and 1B to 8, the speaker disposition structure 1 according to this embodiment includes a speaker box 10 that holds and houses a speaker (not shown). The speaker box 10 is joined to the hinge pillar 5 including the hinge pillar inner 51 and the hinge pillar outer 52 that form the closed cross-section 5s extending vertically (see FIGS. 4 to 8).

The speaker box 10 is a box-like member that holds and houses the speaker inside. In the configuration example described herein, as shown in FIGS. 4, 5, 7, and 8, the speaker box 10 is formed by joining two halved parts, namely an outer box part 11 and an inner box part 21, together into a box. The outer box part 11 is a sheet metal member arranged in the closed cross-section 5s to cover the opening 53 from the closed cross-section 5s. The inner box part 21 is a synthetic resin member disposed more inward than the outer box part 11 in the transverse direction of the vehicle.

As shown in FIGS. 4, 5, 7, and 8, the outer box part 11 includes an outer box body 12 and a flange 13 that form a hat-like cross-section raised outward in the transverse direction of the vehicle. The outer box body 12 includes a bottom, and side walls continuous with the bottom. The bottom and the side walls form a housing space open inside the vehicle cabin. The housing space formed by the outer box body 12 is a part of a speaker housing space 10s, which will be described later. The outer box body 12 is arranged in the opening 53, with its bottom located in the closed cross-section 5s, and with the housing space open inside the vehicle cabin. The inner box part 21 includes an inner box body 22 and a flange 23 that form a hat-like cross-section raised inward in the transverse direction of the vehicle.

The flange 13 is formed along the peripheral edge of the outer box part 11. The part of the flange 13 other than the lower end flange 13a is joined to an edge 55, which includes both the front and rear, and upper edges, of the opening 53 of the inner wall 510 of the hinge pillar from the vehicle cabin 100, for example, by spot welding (see FIGS. 1B, 4, 7, and 8). At the same time, the lower end flange 13a is joined to the upper end flange 61a of the side sill inner 61 and the upper end flange 62a of the side sill outer 62 to be sandwiched therebetween from both the sides in the transverse direction of the vehicle (see FIGS. 1B, 4, and 6).

The flange 23 is formed along the peripheral edge of the inner box part 21. The part of the flange 23 other than a lower end flange 23a is joined to the part of the flange 13 of the outer box part 11 other than the lower end flange 13a from the vehicle cabin 100, for example, by spot welding (see FIGS. 1A, 4, 7, and 8). At the same time, the lower end flange 23a is joined to the upper end flange 61a of the side sill inner 61 from the vehicle cabin 100 (see FIGS. 4 to 6).

Accordingly, at the edge 55 of the opening 53, the outer and inner box parts 11 and 21 are arranged to face each other across the opening 53 in the transverse direction of the vehicle to form a box shape including the speaker housing space 10s inside (see FIGS. 4, 5, 7, and 8).

The vehicle body is however subjected to an electrodeposition coating process, with, out of the speaker box 10, only the outer box part 11 of the sheet metal member joined to the edge 55 of the opening 53 as described above. Out of the speaker box 10, only outer box part 11 is subjected to rust-proofing treatment. On the other hand, the inner box part 21, which is the resin member, is joined to face the outer box part 11 across the opening 53 as described above, after a drying process subsequent to the electrodeposition coating process of the vehicle body.

As viewed from the side of the vehicle, each of the outer and inner box parts 11 and 21 has a substantially rectangular shape, whose vertical length is longer than the longitudinal length, to correspond to the shape of the opening 53 in a front view (i.e., as viewed from the side of the vehicle), while a lower rear 10a is bulged more rearward than an upper rear 10b. (See FIG. 3.)

Now, the outer box body 12 will be described in detail. As shown in FIGS. 3 to 5, 7, and 8, the outer box body 12 includes an outer wall 12a in the transverse direction of the vehicle, an upper wall 12b, a lower wall 12c, a front wall 12d, and a rear wall 12e. The upper wall 12b, the lower wall 12c, the front wall 12d, and the rear wall 12e are the upper, lower, front, and rear surfaces of the outer box body 12.

As shown in FIGS. 3 to 5, the outer box part 11 has an inclined corner 15 as an inclined surface, at a part of the corner between the outer wall 12a and the lower wall 12c. The part includes at least the lower rear 10a in the longitudinal direction (i.e., the part of the corner other than the front in the longitudinal direction in this example).

As shown in FIGS. 4 and 5, this inclined corner 15 is inclined from a lower end 12aa of the outer wall 12a toward an outer end 12ca of the lower wall 12c so that the inclined corner 15 extends downward toward the inside in the transverse direction of the vehicle.

As viewed from front to rear of the vehicle, the outer wall 12a extends vertically, whereas the lower wall 12c extends while gently inclining downward toward the inside in the transverse direction of the vehicle. (See FIG. 4). Accordingly, at least the lower rear 10a of the outer box part 11 in the longitudinal direction, the angle α (see FIG. 4) between the lower wall 12c and the outer wall 12a is set to be obtuse.

The hinge pillar outer 52 and the hinge pillar reinforcement 56 are coupled together to the outer box part 11 and the side sill 6.

Specifically, as shown in FIGS. 4 and 5, the hinge pillar outer 52 is joined to the outer wall 12a of the outer box body 12 from the outside in the transverse direction of the vehicle, and to the outer surface 62c of the side sill outer 62 from the outside in the transverse direction of the vehicle. As shown in FIGS. 2, 4, and 7, the lower hinge pivot 54b described above is provided at a part of the hinge pillar outer 52 between the joint with the outer box part 11 and the joint with the side sill outer 62 in the vertical direction.

Similarly, as shown in FIGS. 2 and 4 to 7, the hinge pillar reinforcement 56 is joined to the outer wall 12a of the outer box body 12 in a position more inward than the hinge pillar outer 52 in the transverse direction of the vehicle, from the outside in the transverse direction of the vehicle. At the same time, the hinge pillar reinforcement 56 is joined to the outer surface 62c of the side sill outer 62 from the outside in the transverse direction of the vehicle.

Accordingly, as viewed from front to rear of the vehicle, the hinge pillar reinforcement 56, the outer box part 11, and the side sill outer 62 enclose the closed cross-section 56s (See FIGS. 4 to 6.)

The hinge pillar reinforcement 56 overlaps and abuts on the hinge pillar outer 52 including the lower hinge pivot 54b provided in the hinge pillar outer 52, from the inside in the transverse direction of the vehicle throughout the substantially entire vertical length, to reinforce the lower hinge pivot 54b.

In the speaker disposition structure 1 in the vehicle according to this embodiment, the speaker box 10 is fixed to the hinge pillar 5. The speaker box 10 holds and houses the speaker (not shown). The hinge pillar 5 includes the hinge pillar inner 51 and the hinge pillar outer 52 that form the closed cross-section 5s extending vertically. (See FIGS. 1A and 1B to 8.)

According to this configuration, the hinge pillar 5 is located at the front corner 100c of the vehicle cabin 100. Thus, the joining of the speaker box 10 to the hinge pillar 5 allows for arrangement of the speaker at the front corner 100c, and efficient transmission of the sound generated by the speaker toward the vehicle cabin. In addition, since the speaker box 10 that holds and houses the speaker is joined to the rigid hinge pillar 5, the abnormal noise effectively decreases.

Therefore, an improvement in the reproduction efficiency of the speaker and a reduction in the abnormal noise of the vehicle generated by the speaker can both be achieved.

In one embodiment, the opening 53 is open in the transverse direction of the vehicle in the hinge pillar inner 51 (see FIGS. 2 to 5, 7, and 8). The speaker box 10 includes the outer box part 11 (see FIGS. 1B, 3, and 4), which is the sheet metal member including the bottom, and the side walls that form the space housing the speaker, together with the bottom. The outer box part 11 is arranged in the opening 53, with the bottom located in the closed cross-section 5s and with the housing space open inside the vehicle cabin. At the same time, the outer box part 11 is joined to the edge 55 of the opening 53. (See FIGS. 1B to 8.)

According to this configuration, the outer box part 11 (a part of the speaker box 10) is joined to the edge 55 of the opening 53 of the hinge pillar inner 51, and is formed of the sheet metal member. The joining of the speaker box 10 to the hinge pillar 5 allows the hinge pillar 5 to exhibit a sufficient strength. The advantages described above, that is, an improvement in the reproduction efficiency of the speaker and a reduction in the abnormal noise of the vehicle generated by the speaker can both be achieved.

In one embodiment, the lower part of the hinge pillar inner 51 serves as the rear edge 51r, which extends downward toward the rear. (See FIGS. 1A and 1B to 3.) The outer box part 11 is arranged below the lower part of the hinge pillar inner 51. (See FIGS. 1A and 1B to 3.) The lower rear 10a of the outer box part 11 is bulged more rearward than the upper rear 10b of the outer box part 11 along the rear edge 51r, which is the lower part of the hinge pillar inner plate 51. (See FIGS. 1A and 1B to 3.) The lower rear 10a includes the inclined corner 15 between the outer wall (i.e., the outer side surface) 12a and the lower wall (i.e., the lower surface) 12c of the outer box part 11. (See FIGS. 3 to 5.)

According to this configuration, the rear edge 51r, which is the lower part of the hinge pillar inner plate 51, extends rearward toward the bottom. Taking advantage of this shape, the lower rear 10a of the outer box part 11 is bulged rearward, thereby increasing the capacity of the speaker box 10. This improves the reproduction efficiency of the speaker.

The lower rear 10a of the outer box part 11 is bulged rearward. Even such a configuration efficiently discharges electrodeposition liquid, which has flowed into a space 11s inside the outer box part 11, outside the outer box part 11, without retaining the electrodeposition liquid in the lower rear 10a (particularly, the inclined corner 15 of the lower rear 10a). Reliable rust-proofing treatment is thus possible. This allows for joining of the speaker box to the hinge pillar in the assembly process of the vehicle body. In addition, the inner box part 21 arranged after the electrodeposition process seals the inside of the speaker box 10 to more efficiently transmit the sound generated by the speaker toward the vehicle cabin 100.

Here, the electrodeposition process (or the electrodeposition coating process) of the vehicle body is generally performed, while moving the vehicle body forward along the arch-like trajectory raised downward. This is for immersing the entire vehicle body in the electrodeposition liquid at the lowest point of the trajectory, when the vehicle body passes through a storage tank storing the electrodeposition liquid.

Specifically, the electrodeposition process is performed as follows (not shown in the figures). The vehicle body is immersed into the electrodeposition liquid stored in the storage tank generally from front to rear, with the front positioned lower than the rear. After the entire vehicle body has been immersed into the electrodeposition liquid, the vehicle body is picked up from the electrodeposition liquid generally from front to rear, with the front positioned higher than the rear.

This electrodeposition process is performed as described above, with the resin inner box part 21 detached, which requires no electrodeposition process. The inner box part 21 is attached after the electrodeposition process.

Now, when the vehicle body is picked up from the electrodeposition liquid, with the front positioned higher than the rear, the outer box part 11 is also inclined, with the front positioned higher than the rear in accordance with the vehicle body inclined with the front positioned higher than the rear. Accordingly, the electrodeposition liquid, which has flowed inside the outer box part 11, tends to remain (i.e., liquid stagnation) at the lower rear 10a with the bulged rear in the space 11s inside the outer box part 11.

By contrast, in this embodiment, the lower rear 10a includes the inclined corner 15, which is inclined inward in the transverse direction of the vehicle toward the bottom (see FIG. 5). This reliably discharges the electrodeposition liquid without retaining the liquid even at the lower rear 10a.

In short, since the speaker box 10 needs to have sealing properties in view of improving the reproduction efficiency of the sound including the low range, the drainage performance tends to deteriorate. A contradictory problem then arises: it becomes difficult for the outer box part 11 formed of the sheet metal member to reliably discharge the electrodeposition liquid, which has flowed into the space 11s inside the outer box part 11, in view of reliably performing the rust-proofing treatment into the inner wall of the outer box part 11. As described above, the inclined corner 15 is provided at the lower rear 10a of the outer box part 11, which exhibits a particularly low drainage performance. This configuration allows the outer box part 11 to have a shape easily exhibiting sealing properties and to reliably discharge the electrodeposition liquid.

In one embodiment, the angle α between the lower wall (i.e., the lower surface) 12c and the outer wall (i.e., the outer side surface) 12a at the lower rear 10a of the outer box part 11 is set to be obtuse. (See FIG. 4.)

According to this configuration, in the electrodeposition process, the electrodeposition liquid, which has flowed into the space 11s inside the outer box part 11, is efficiently discharged outside the outer box part 11, without retaining the electrodeposition liquid particularly at the lower wall 12c of the lower rear 10a. This allows for joining of the speaker box to the hinge pillar in the assembly process of the vehicle body.

In one embodiment, the hinge pillar 5 includes the hinge pillar reinforcement 56, which is coupled to the outer box part 11 and the side sill 6 (see FIGS. 2 and 4 to 7). The side sill 6 is fixed to the lower part of the hinge pillar 5 and extends in the longitudinal direction of the vehicle.

According to this configuration, the hinge pillar reinforcement 56 is coupled to the hinge pillar inner 51 not directly but via the outer box part 11, which is the sheet metal member, to allow the outer box part 11 to function as a part of the hinge pillar reinforcement 56. This configuration reduces the size (i.e. simplifies the shape) of the hinge pillar reinforcement 56 itself and reduces the weight of the hinge pillar reinforcement 56, while providing a sufficient strength at the joint between the hinge pillar 5 and the side sill 6.

To be specific, if a side impact load is applied to the front door (not shown), the hinge pillar 5, which is joined to the front end of the front door via the door hinges (not shown), receives the side impact load, not to press the front door into the vehicle cabin 100.

At this time, the hinge pillar 5 receives the side impact load, together with the side sill 6 joined to the lower part of the hinge pillar 5 not to be pressed inside the vehicle cabin 100, together with the front door.

As in this embodiment, the hinge pillar reinforcement 56 is coupled to the side sill 6 and the outer box part 11 formed of the sheet metal member. This increases the strength of the side sill 6 supporting the hinge pillar 5 at side collision.

In particular, the outer surface 62c of the side sill outer 62 and the outer wall 12a of the outer box part 11 are coupled together by the hinge pillar reinforcement 56. This configuration allows the side sill outer 62, the outer box part 11, and the hinge pillar reinforcement 56 to enclose and define the closed cross-section 56s (see FIGS. 4 to 6). This effectively increases the strength of the joint between the hinge pillar 5 and the side sill 6. That is, the hinge pillar reinforcement 56 reliably reduces deformation such as twisting of the side sill 6 at side collision.

In addition, the hinge pillar reinforcement 56 is coupled to the hinge pillar inner 51 via the outer box part 11, thereby simplifying the shape of the hinge pillar reinforcement 56 itself and reducing the weight of the hinge pillar reinforcement 56, as compared to the case where the hinge pillar inner 51 is coupled to the hinge pillar inner 51 directly.

The technology disclosed herein is not limited to the configurations according to the embodiments described above, and may be implemented in various embodiments.

DESCRIPTION OF REFERENCE CHARACTERS

1 Arrangement Structure of Speaker
5 Hinge Pillar
5s Closed Cross-Section
10 Speaker Box
10a Lower Rear
10b Upper Rear
11 Outer Box Part
12a Outer Wall in Transverse Direction of Vehicle (Vehicle Outer Side Surface)
12aa Lower End of Outer Wall (Lower End of Vehicle Outer Side Surface)
12c Lower Wall (Lower Surface)
12ca Outer End of Lower Wall in Transverse Direction of Vehicle (Outer End of Lower Surface in Transverse Direction of Vehicle)
15 Inclined Corner
21 Inner Box Part
51 Hinge Pillar Inner
52 Hinge Pillar Outer
53 Opening
55 Edge of Opening
51 Hinge Pillar Inner
51r Rear Edge
56 Hinge Pillar Reinforcement
α Angle between Lower Wall and Outer Wall in Transverse Direction of Vehicle (Angle between Lower Surface and Vehicle Outer Side Surface).

The invention claimed is:
1. A structure for arranging a speaker in a vehicle, the structure comprising:

a hinge pillar including a hinge pillar inner and a hinge pillar outer that form a closed cross-section extending vertically; and a speaker box fixed to the hinge pillar and configured to hold and house a speaker therein, wherein an opening is open in a transverse direction of the vehicle in a lower part of the hinge pillar inner, the speaker box includes an outer box part and an inner box part, the outer box part being formed of a sheet metal member arranged in a closed cross-section to cover the opening from the closed cross-section, the inner box part being disposed more inward than the outer box part in the transverse direction, the outer box part is joined to an edge of the opening and is electrodeposition coated together with a vehicle body while being joined to the edge of the opening, and the outer box part includes an outer side surface, a lower surface, and an inclined corner, the outer side surface extending vertically along the hinge pillar outer, the inclined corner being inclined from a lower end of the outer side surface toward an outer end of the outer side surface to extend downward the inside in the transverse direction.

2. The structure of claim 1, wherein
the outer box part is arranged in the opening, with the lower surface located in the closed cross-section and with the housing space open inside a vehicle cabin.

3. The structure of claim 2, wherein
a lower part of the hinge pillar inner includes a rear edge extending rearward toward a bottom, and
a lower rear of the outer box part is bulged more rearward than an upper rear of the box part along a lower rear edge of the hinge pillar inner.

4. The structure of claim 3, wherein
an angle between the lower surface and the vehicle outer side surface at the lower rear of the outer box part is set to be obtuse.

5. The structure of claim 4, wherein
the hinge pillar includes a hinge pillar reinforcement, and
the hinge pillar reinforcement is coupled to the outer box part and to a side sill fixed to a lower part of the hinge pillar and extending in a longitudinal direction of the vehicle.

6. The structure of claim 3, wherein
the hinge pillar includes a hinge pillar reinforcement, and
the hinge pillar reinforcement is coupled to the outer box part and to a side sill fixed to a lower part of the hinge pillar and extending in a longitudinal direction of the vehicle.

7. The structure of claim 2, wherein
the hinge pillar includes a hinge pillar reinforcement, and the hinge pillar reinforcement is coupled to the outer box part and to a side sill fixed to a lower part of the hinge pillar and extending in a longitudinal direction of the vehicle.

8. The structure of claim 1, wherein
a flange is formed along a peripheral edge of the outer box part, the flange including a lower end flange,
a part of the flange other than the lower end flange is joined to an edge of the opening from a vehicle cabin by spot welding, and
the lower end flange is joined to a side sill inner and a side sill outer to be sandwiched therebetween from both the sides in the transverse direction.

9. The structure of claim 8, wherein
a flange is formed along a peripheral edge of the inner box part, the flange including a lower end flange,
a part of the flange other than the lower end flange of the inner box part is joined to the flange of the outer box part from a vehicle cabin by spot welding, and
the lower end flange of the inner box part is joined to a side sill inner from the vehicle cabin.

10. The structure of claim 8, wherein
the vehicle body is subjected to an electrodeposition coating process, with, out of the speaker box, only the outer box part,
out of the speaker box, only the outer box part is subjected to rust-proofing treatment, and
the inner box part is formed of a resin member, and is joined to face the outer box part across the opening, after a drying process subsequent to the electrodeposition coating process.

11. The structure of claim 1, wherein
a flange is formed along a peripheral edge of the inner box part, the flange including a lower end flange,
a part of the flange other than the lower end flange is joined to the outer box part from a vehicle cabin by spot welding, and
the lower end flange is joined to a side sill inner from the vehicle cabin.

12. The structure of claim 1, wherein
the vehicle body is subjected to an electrodeposition coating process, with, out of the speaker box, only the outer box part,
out of the speaker box, only the outer box part is subjected to rust-proofing treatment, and
the inner box part is formed of a resin member, and is joined to face the outer box part across the opening, after a drying process subsequent to the electrodeposition coating process.

* * * * *